US011223780B1

(12) United States Patent
Wang et al.

(10) Patent No.: US 11,223,780 B1
(45) Date of Patent: Jan. 11, 2022

(54) TWO-STAGE METHOD TO MERGE BURST IMAGE FRAMES

(71) Applicant: Black Sesame International Holding Limited, Santa Clara, CA (US)

(72) Inventors: Chao Wang, Shanghai (CN); Donghui Wu, San Mateo, CA (US); Bin Chen, San Jose, CA (US); Jiaju Yue, San Jose, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 0 days.

(21) Appl. No.: 17/079,176

(22) Filed: Oct. 23, 2020

(51) Int. Cl.
*H04N 5/235* (2006.01)
*H04N 5/262* (2006.01)

(52) U.S. Cl.
CPC ......... *H04N 5/2356* (2013.01); *H04N 5/2621* (2013.01)

(58) Field of Classification Search
CPC ............ G06T 7/593; G06T 7/50; G06T 7/20; G06T 2207/10028; G06T 2207/20084; G06T 2207/10024; G06T 2207/10144; G06T 2207/20208; G06T 5/007; G06T 5/50; H04N 5/232933; H04N 5/2355; H04N 5/2258; H04N 5/23254; H04N 5/2352; H04N 5/2356
See application file for complete search history.

(56) References Cited

U.S. PATENT DOCUMENTS 10,977,778 B2 * 4/2021 Tico ........................ G06T 5/009
2014/0307960 A1 * 10/2014 Sharma ............. H04N 5/23229 382/162
2015/0312463 A1 * 10/2015 Gupta ................. H04N 5/2355 348/239
2015/0350513 A1 * 12/2015 Zhang ................. G06K 9/4661 348/362
2016/0323490 A1 * 11/2016 Thumpudi ......... H04N 5/23222
2017/0359534 A1 * 12/2017 Li ..................... H04N 5/23238
2018/0330466 A1 * 11/2018 Basso .................... H04N 5/217
2020/0068151 A1 * 2/2020 Pourreza Shahri ..... G06T 5/002
2020/0219240 A1 * 7/2020 Kang ...................... G06T 5/007
2020/0242788 A1 * 7/2020 Jacobs .................... G06T 7/593
2020/0357102 A1 * 11/2020 Pekkucuksen .......... G06T 5/003
2021/0084272 A1 * 3/2021 Wei .......................... H04N 9/69

* cited by examiner

*Primary Examiner* — Antoinette T Spinks
(74) *Attorney, Agent, or Firm* — Timothy T. Wang; Ni, Wang & Massand, PLLC

(57) ABSTRACT

A method of multiple-exposure multiple-frame image capture, comprising, capturing a first group of frames at an underexposed setting, selecting a first key frame from the first group of frames, aligning the first group of frames to the first key frame, merging the first group of frames into one first frame, capturing a second group of frames at the underexposed setting, selecting a second key frame from the second group of frames, aligning the second group of frames to the second key frame, merging the second group of frames into one second frame, selecting a main group of frames based on the first key frame and the second key frame, aligning the first key frame and the second key frame based on the main group of frames and merging the first key frame and the second key frame based on the main group of frames.

11 Claims, 5 Drawing Sheets

100

Disk 110

I/O Interface 128

Network Interface 126

Central Interconnect 124

GPU(s) 120

CPU(s) 118

FPGA(s) 122

PLC to Memory Interconnect 130

Memory Interface and Controller 112

System Memory 114

Read Only Memory 116

TWO-STAGE METHOD TO MERGE BURST IMAGE FRAMES

BACKGROUND

Technical Field

The instant disclosure is related to burst frames and specifically to providing a method of two-stage merging of burst image frames.

Background

Raw data captured by a conventional camera is approximately linear to lighting conditions, aperture size, shutter and International Organization for Standardization (ISO), if it is noise free. Considering a static scene with a fixed camera, the raw data captured is almost linear to integration time (shutter) and/or the ISO. This linearity property makes the processing of multiple raw frames possible for preserving color appearance and dynamic range.

SUMMARY

An example method of multiple-exposure multiple-frame image capture, comprising, capturing a first group of frames at an underexposed setting, selecting a first key frame from the first group of frames, aligning the first group of frames to the first key frame, merging the first group of frames into one first frame based on the first key frame, capturing a second group of frames at the underexposed setting, selecting a second key frame from the second group of frames, aligning the second group of frames to the second key frame, merging the second group of frames into one second frame based on the second key frame, selecting a main group of frames based on the first key frame and the second key frame, aligning the first key frame and the second key frame based on the main group of frames and merging the first key frame and the second key frame based on the main group of frames.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names.

This document does not intend to distinguish between components and/or methods that differ in name but not in function.

In the following discussion and in the claims, the terms “including” and “comprising” are used in an open-ended fashion, and thus may be interpreted to mean “including, but not limited to . . . .” Also, the term “couple” or “couples” is intended to mean either an indirect or direct connection. Thus, if a first device couples to a second device that connection may be through a direct connection or through an indirect connection via other devices and connections.

Figure 1:
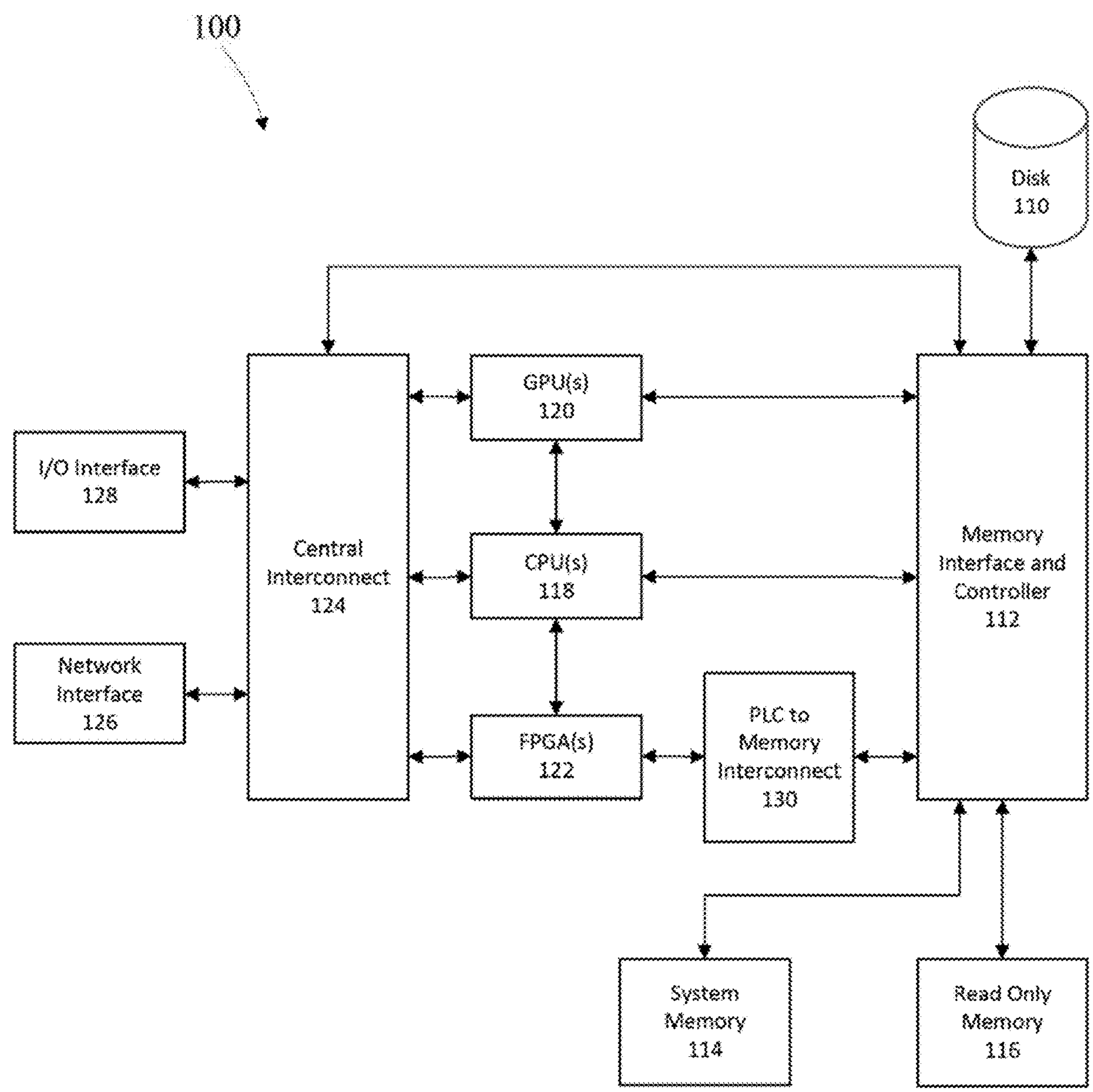
FIG. 1 is a first example system diagram in accordance with one embodiment of the disclosure.

FIG. 1 depicts an example hybrid computational system 100 that may be used to implement neural nets associated with the operation of one or more portions or steps of process 600. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 are additionally connected to persistent memory disk 110, system memory 114 and read only memory (ROM) 116.

The system of FIG. 1A may be utilized for programming and training the FPGA. The GPU functions well with unstructured data and may be utilized for training, once the data has been trained a deterministic inference model may be found and the CPU may program the FPGA with the model data determined by the GPU.

The memory interface and controller are connected to a central interconnect 124, the central interconnect is additionally connected to the GPU 120, CPU 118 and FPGA 122. The central interconnect 124 is additionally connected to the input and output interface 128 and the network interface 126.

Figure 2:
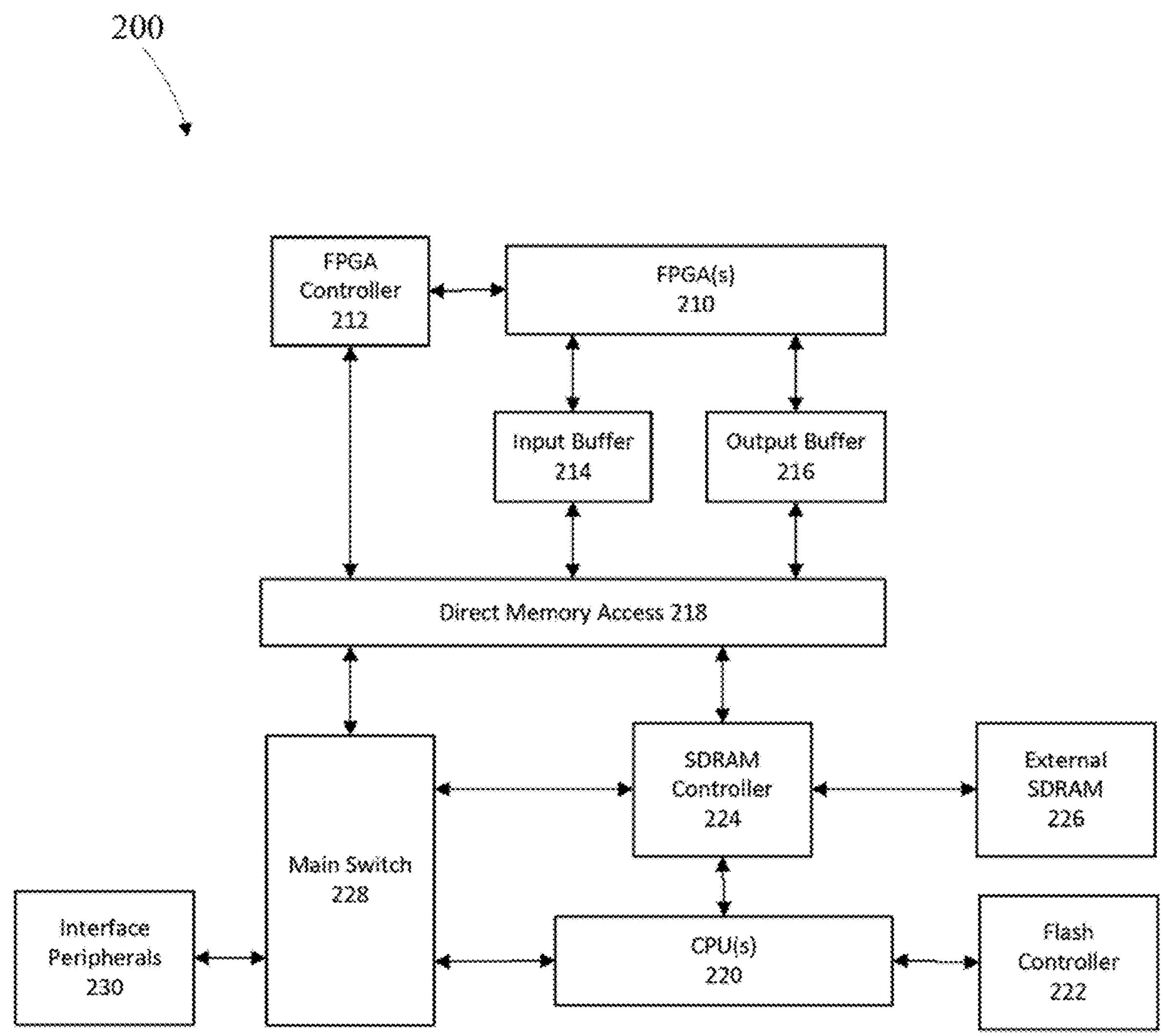
FIG. 2 is a second example system diagram in accordance with one embodiment of the disclosure.

FIG. 2 depicts a second example hybrid computational system 200 that may be used to implement neural nets associated with the operation of one or more portions or steps of process 1000. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

The noise in the raw data is approximately proportional to the signal level. Higher International Organization for Standardization (ISO) may lead to higher noise which may be calibrated out by sensor characterization. This may lead to a way to distinguish noise from moving objects. Longer integration times may result in motion blur.

Raw data has almost no digital processing after capture from the sensor or camera, thus allowing preservation of the original image information, which facilitates possible post-processing and image adjustment.

Raw data may be captured by either a digital single lens reflex (DSLR) camera or a complementary metal oxide semiconductor (CMOS) image sensor built in to most mobile phones.

With a pre-determined short exposure value (EV), F frames of short exposure raw data may be captured. Image processing may include image alignment and merging in raw domain. After alignment and merging, the output of these key steps may retain their raw format. A conventional image signal processor may be employed for de-noising. With respect to high dynamic range (HDR) images, tone-mapping or exposure fusion methods may be relied upon.

Globally aligned frames may be denoted as $Im_i(x)$, i=1, 2, . . . , F. The merge operation may be represented as locally varying weighting as Eqn. (1)

$$CumImage(x) = \sum_{i=1}^{F} W_i(x, s_i) Im_i(x, s_i) \quad (1)$$

Where $s_i$ denotes the locally varying alignment parameters for the i-th frame. The weighting may increase robustness in correcting global alignment error caused by computation error, a locally moving object or occlusions between frames.

The raw data linearity property and noise distinguishability may allow accumulation, weighted summation or the like, to be implemented. The accumulated image may be normalized to the locally varying weights. Another global normalizer K may facilitate flexible usage between dynamic range extension and noise reduction. The merged image may be represented as Eqn. (2)

$$MergedImage(x) = \frac{\sum_{i=1}^{F} w_i \mathrm{Im}_i}{K \sum_{i=1}^{F} w_i} \quad (2)$$

Because the burst images are captured with identical EVs, the signals in each frame may be considered comparable. In most of the areas, the weights between different frames may also be comparable, thus the analysis on K may be simplified by taking $W_i=1$ for all $1 \le i \le F$. Thus the merged image becomes Eqn. (3)

$$SimpleMergedImage(x) = \frac{\sum_{i=1}^{F} Im_i(x)}{KF} \quad (3)$$

When the normalizer K is 1, then the merged image is of the same signal level as each input image, it is essentially a de-noised version of the input images; the equivalent EV value of the output is identical to the input burst images;

When the normalizer K is less than 1, then the maximum value of the merged image is about 1/K times as that of the input single image. In one example, when K=0.25, the dynamic range of the merged image is about 4 times of the single image. The product of K and F is generally greater than 1, otherwise the simple merged image may become the summation of the images with a digital gain 1/(KF), which will increase the signal level with no practical benefits;

When the normalizer K equals to 1/F, the simple merged image is the summation of the input image, which approximates a longer exposure (F times of the individual short exposure), but with the highlight details preserved, i.e., the dynamic range is extended by F times. The equivalent EV value is increased by about $\log_2(F)$, comparing to the individual input image.

In burst raw image processing, a key frame may first be selected as a main frame. Selection is typically based on the best frame within the burst frames, in other examples the selection may be based on highest signal to noise ratio, largest contrast and the like.

Burst processing of raw frames utilizes data linearity allowing the signal level to be scalable, which may be simulated as a longer exposure to extend the dynamic range. The measurable noise level may increase the merge operation accuracy in distinguishing noise from motion ghosting.

If there are F frames in the burst sequence, the first F−1 frames may be placed into a buffer. When the F-th frame data is received, main frame selection, alignment and merging may be implemented.

F may be factored into F=M×N, M, N>1. This may allow uniformly grouping an image sequence into M groups, with N frames in each group. For group 1, a common burst process unit may be utilized to produce a de-noised or high dynamic range (HDR) raw image and sent to a stage 2 buffer. The buffer size in group 1 is N−1 frames. After the process for group 1 is completed, the resulting raw data may be sent to the stage 2 buffer, and the stage 1 buffer may be released and be readied for group 2 uses. In this way the stage 1 buffer may be refreshed for each group.

When the de-noised or high dynamic range (HDR) raw data in group M is staged, there are M−1 frames in stage 2 buffer open for use. Data may be input to the $2^{nd}$ stage process unit, where the $2^{nd}$ process flow is nearly identical to the $1^{st}$ stage. The input frames of the $2^{nd}$ stage are output frames from the $1^{st}$ stage, not the direct raw data captured from the camera, having a similar data structure. The main frame selection operation in the $1^{st}$ stage may be based on direct raw data captured from the camera, while the one in the $2^{nd}$ stage may be based on the output of the $1^{st}$ stage. If the $1^{st}$ stage processes the burst frames beyond de-noising, such that the dynamic range of the stage 1 output is extended, then the bit-width of the $2^{nd}$ stage may be higher than that of the $1^{st}$ stage. The main group or frame selection, alignment and merge blocks may also operate at a higher bit width.

Figure 3:
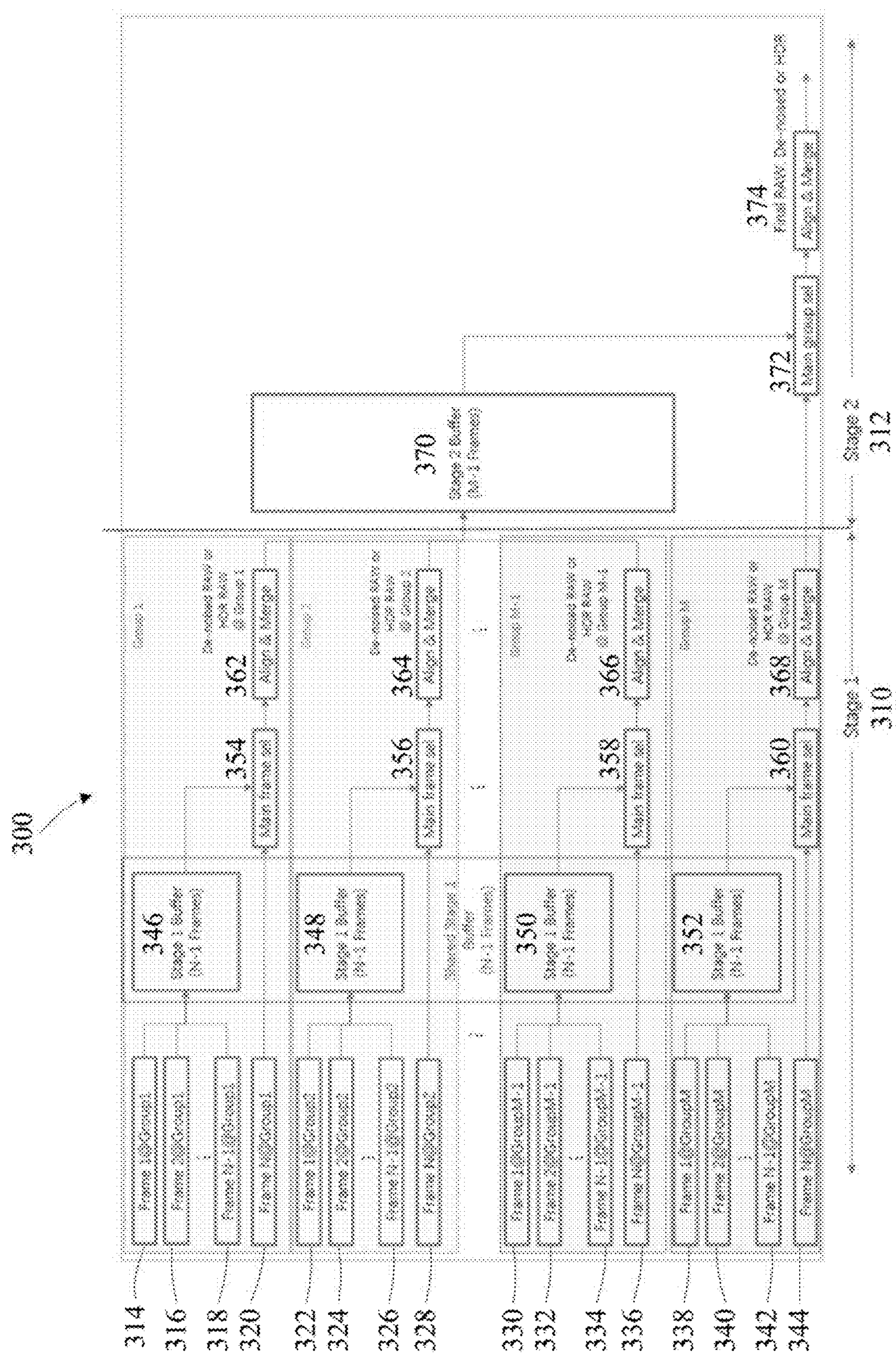
FIG. 3 is an example two-stage burst processing flow in accordance with one embodiment of the disclosure.

The total frame buffer of the two-stage framework is approximately M+N−2 frames. The two-stage process is shown in FIG. 3. The burst raw frames structure is suitable for processing linear data with a measurable noise level.

The burst processing unit outputs the data in a linear domain, which may be shown by Eqn. (2). The processing unit shares the same structure and controlling parameters, and thus the dynamic ranges of the resulting data in different groups of stage 1 may also be the same.

The noise level of the output in the $1^{st}$ stage may be predictable. If the noise level or variance of the original sensor raw data is $\sigma^2$, and the information from the N frames within the group provided is comparable, the variance of the noise may be $N\sigma^2$. If it is a high dynamic range (HDR) process, KF=1 in Eqn. (3), if it is a de-noising process, K=1 in Eqn. (3) and the variance of noise becomes $$\frac{\sigma^2}{N}.$$

If the method simultaneously de-noises the data and outputs a high dynamic range (HDR) data, 1>K>1/F in Eqn. (3), the variance then falls to approximately $$\frac{\sigma^2}{NK^2}.$$

If the total frame number F is factored into two factors M and N, where both M and N are greater than 1, the frame buffer may be reduced from F−1=MN−1 frames to M+N−2 frames. Thus M+N−2 is smaller than MN−1 for integer M>1 and N>1. To most efficiently utilize the buffer, given an F value, the closer the values M and N are, the smaller the buffer.

The process may be extended to include additional stages. For example, if F is factored such that the factor values are greater than 1, $F=N_1N_2 \ldots N_k$, where $N_i>1$. The kth stage flow unit may process $N_k$ frames, and the frame buffer size will be $$\sum_{i=1}^{k} N_i - .$$

Thus, the buffer size may be further reduced as compared to a two-stage process.

FIG. 3 depicts two stages, a stage 1, 310 and a stage 2, 312. The stage 1, group 1 frames are broken into frame 1, 314, frame 2, 316, frame N−1, 318 and frame N, 320. Frames 1, 2 and N−1 of group 1 are routed into the stage 1 buffer 346 which has N−1 frames. A main frame selection module 354 receives the frames from the stage 1 buffer 346 and frame N, 320 from group 1. The main frame selection module 354 selects a frame according to a specific criteria, in this example, the best frame, and routes the data to an alignment and merge module 362 which outputs a de-noised raw or HDR frame. The frame selection module may use other selection criteria such as highest signal to noise ratio, largest contrast, and the like.

Group 2 is made up of frame 1, 322, frame 2, 324, frame N−1 326 and frame N, 328. Frames 1, 2 and N−1 of group 2 are routed into the stage 1 buffer 348 which has N−1 frames. A main frame selection module 356 receives the frames from the stage 1 buffer 348 and frame N, 328 from group 2. The main frame selection module 356 selects the best frame and routes the data to an alignment and merge module 364 which outputs a de-noised raw or HDR frame.

Group M−1 is broken into frame 1, 330, frame 2, 332, frame N−1, 334 and frame N, 336. Frames 1, 2 and N−1 of group 2 are routed into the stage 1 buffer 350 which has N−1 frames. A main frame selection module 358 receives the frames from the stage 1 buffer 350 and frame N, 336 from group M−1. The main frame selection module 358 selects the best frame and routes the data to an alignment and merge module 366 which outputs a de-noised raw or HDR frame.

Group M is broken into frame 1, 338, frame 2, 340, frame N−1, 342 and frame N, 344. Frames 1, 2 and N−1 of group M are routed into the stage 1 buffer 352 which has N−1 frames. A main frame selection module 360 receives the frames from the stage 1 buffer 352 and frame N, 344 from group M. The main frame selection module 360 selects the best frame and routes the data to an alignment and merge module 368 which outputs a de-noised raw or HDR frame.

The stage 2 buffer 370, which is made up of M−1 frames, receives the data from alignment and merge modules 362, 364 and 366. The main group select module 372 receives the output from the stage 2 buffer 370 and the alignment and merge module 368. The main group select module 372 outputs a stage 2 align and merge module 374 that outputs final raw de-noised or HDR data.

As the number of the stages is increased and applied to an HDR process, the frame buffer in the latter stages will be of higher bit-width than that in the starting stages.

Figure 4:
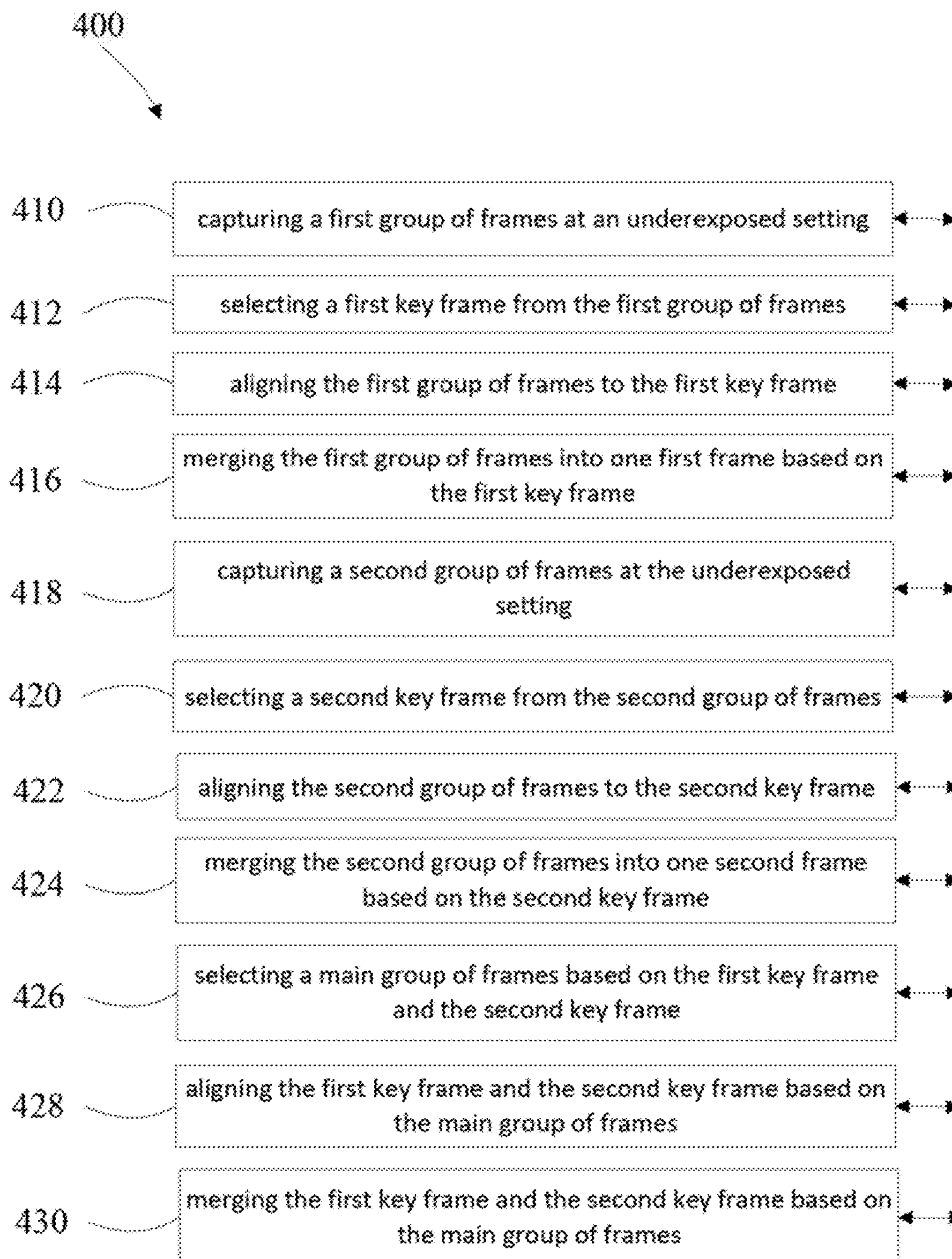
FIG. 4 is an example method in accordance with one embodiment of the disclosure.

FIG. 4 depicts an example method of multiple-exposure multiple-frame image capture, comprising, capturing 410 a first group of frames at an underexposed setting, selecting 412 a first key frame from the first group of frames, aligning 414 the first group of frames to the first key frame and merging 416 the first group of frames into one first frame based on the first key frame. The example method also includes capturing 418 a second group of frames at the underexposed setting, selecting 420 a second key frame from the second group of frames, aligning 422 the second group of frames to the second key frame and merging 424 the second group of frames into one second frame based on the second key frame. The example method further includes selecting 426 a main group of frames based on the first key frame and the second key frame, aligning 428 the first key frame and the second key frame based on the main group of frames and merging 430 the first key frame and the second key frame based on the main group of frames.

Figure 5:
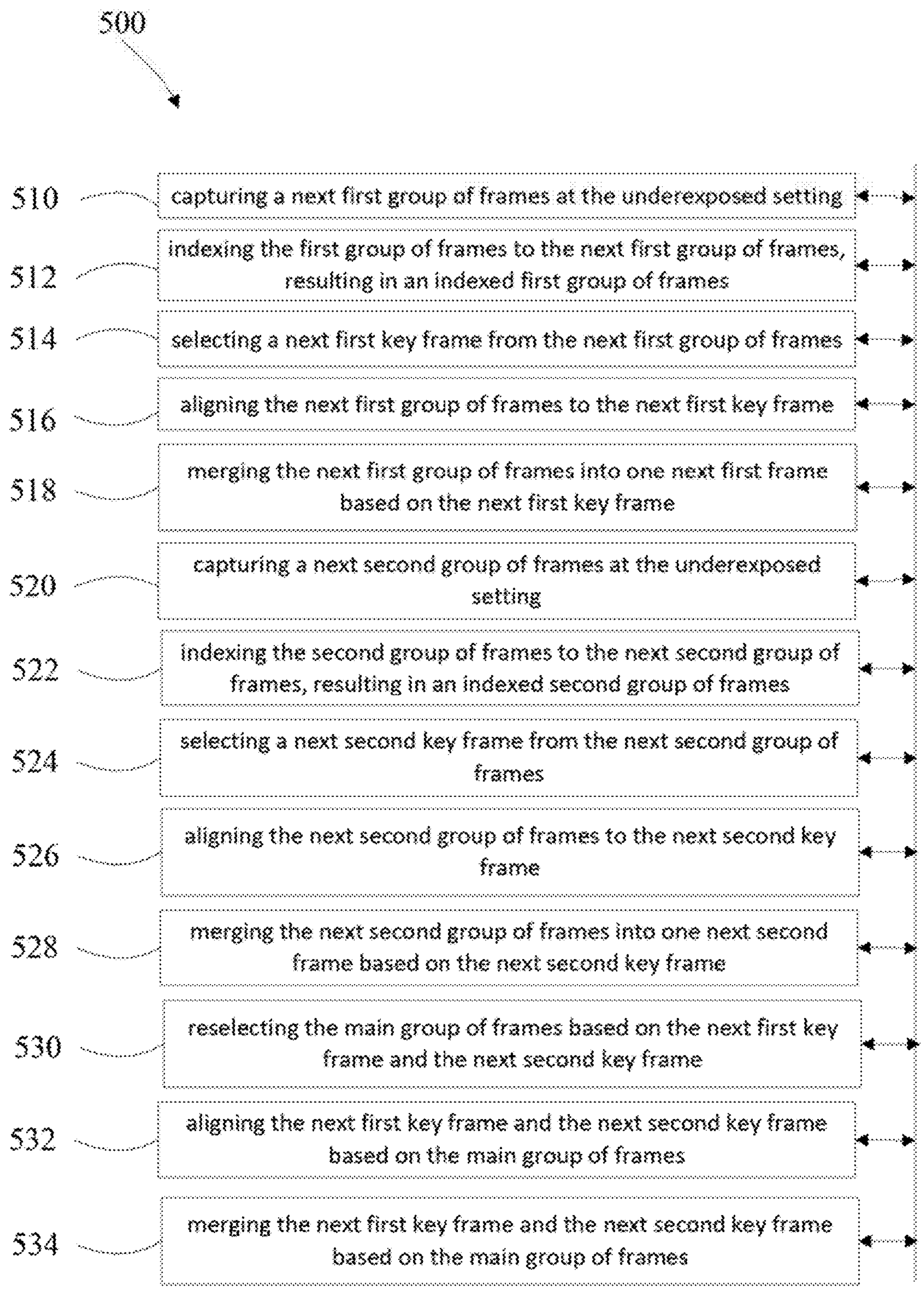
FIG. 5 is another example method in accordance with one embodiment of the disclosure.

FIG. 5 depicts the example method of FIG. 4 that may further include capturing 510 a next first group of frames at the underexposed setting, indexing 512 the first group of frames to the next first group of frames, resulting in an indexed first group of frames, selecting 514 a next first key frame from the next first group of frames, aligning 516 the next first group of frames to the next first key frame and merging 518 the next first group of frames into one next first frame based on the next first key frame. The example method may also include capturing 520 a next second group of frames at the underexposed setting, indexing 522 the second group of frames to the next second group of frames, resulting in an indexed second group of frames, selecting 524 a next second key frame from the next second group of frames, aligning 526 the next second group of frames to the next second key frame and merging 528 the next second group of frames into one next second frame based on the next second key frame. The example method may further include reselecting 530 the main group of frames based on the next first key frame and the next second key frame, aligning 532 the next first key frame and the next second key frame based on the main group of frames and merging 534 the next first key frame and the next second key frame based on the main group of frames.

The example method may also include indexing a capturing of another first group of frames the underexposed setting by N and indexing a capturing of another second group of frames the underexposed setting by N.

The example method may further include iteratively indexing a capturing of another first group of frames at the underexposed setting by N and iteratively indexing a capturing of another second group of frames at the underexposed setting by N. The first group of frames and the second group of frames may be comprised of raw data and/or low dynamic range data. The first key frame may be based on a best frame within the first group of frames and the second key frame may be based on a best frame within the second group of frames. The first group of frames and the second group of frames may be captured with approximately equivalent exposure values. The first group of frames and/or the second group of frames may be buffered.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the system. Skilled artisans may implement the described functionality in varying ways for each particular application. Various components and blocks may be arranged differently (e.g., arranged in a different order, or partitioned in a different way) without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects may be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean “one and only one” unless specifically so stated, but rather “one or more.” Unless specifically stated otherwise, the term “some” refers to one or more. Pronouns in the masculine (e.g., his) include the feminine and neuter gender (e.g., her and its) and vice versa. Headings and subheadings, if any, are used for convenience only and do not limit the invention. The predicate words “configured to”, “operable to”, and “programmed to” do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an “aspect” does not imply that such aspect is essential to the subject technology or that such aspect applies to configurations of the subject technology. A disclosure relating to an aspect may apply to configurations, or one or more configurations. An aspect may provide one or more examples. A phrase such as an aspect may refer to one or more aspects and vice versa. A phrase such as an “embodiment” does not imply that such embodiment is essential to the subject technology or that such embodiment applies to configurations of the subject technology. A disclosure relating to an embodiment may apply to embodiments, or one or more embodiments. An embodiment may provide one or more examples. A phrase such as an “embodiment” may refer to one or more embodiments and vice versa. A phrase such as a “configuration” does not imply that such configuration is essential to the subject technology or that such configuration applies to configurations of the subject technology. A disclosure relating to a configuration may apply to configurations, or one or more configurations. A configuration may provide one or more examples. A phrase such as a “configuration” may refer to one or more configurations and vice versa.

The word “example” is used herein to mean “serving as an example or illustration.” Any aspect or design described herein as “example” is not necessarily to be construed as preferred or advantageous over other aspects or designs.

Structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase “means for” or, in the case of a method claim, the element is recited using the phrase “step for.” Furthermore, to the extent that the term “include,” “have,” or the like is used in the description or the claims, such term is intended to be inclusive in a manner similar to the term “comprise” as “comprise” is interpreted when employed as a transitional word in a claim.

References to “one embodiment,” “an embodiment,” “some embodiments,” “various embodiments”, or the like indicate that a particular element or characteristic is included in at least one embodiment of the invention. Although the phrases may appear in various places, the phrases do not necessarily refer to the same embodiment. In conjunction with the present disclosure, those skilled in the art may be able to design and incorporate any one of the variety of mechanisms suitable for accomplishing the above described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A method of multiple-exposure multiple-frame image capture, comprising:

capturing a first group of frames at an underexposed setting;

selecting a first key frame from the first group of frames;

aligning the first group of frames to the first key frame;

merging the first group of frames into one first frame based on the first key frame;

capturing a second group of frames at the underexposed setting;

selecting a second key frame from the second group of frames;

aligning the second group of frames to the second key frame;

merging the second group of frames into one second frame based on the second key frame;

selecting a main group of frames based on the first key frame and the second key frame;

aligning the first key frame and the second key frame based on the main group of frames; and merging the first key frame and the second key frame based on the main group of frames.

2. The method of multiple-exposure multiple-frame image capture of claim 1, further comprising:

capturing a next first group of frames at the underexposed setting;

indexing the first group of frames to the next first group of frames, resulting in an indexed first group of frames;

selecting a next first key frame from the next first group of frames;

aligning the next first group of frames to the next first key frame;

merging the next first group of frames into one next first frame based on the next first key frame;

capturing a next second group of frames at the underexposed setting;

indexing the second group of frames to the next second group of frames, resulting in an indexed second group of frames;

selecting a next second key frame from the next second group of frames;

aligning the next second group of frames to the next second key frame;

merging the next second group of frames into one next second frame based on the next second key frame;

reselecting the main group of frames based on the next first key frame and the next second key frame;

aligning the next first key frame and the next second key frame based on the main group of frames; and merging the next first key frame and the next second key frame based on the main group of frames.

3. The method of multiple-exposure multiple-frame image capture of claim 1, further comprising:

indexing a capturing of another first group of frames the underexposed setting by N; and indexing a capturing of another second group of frames the underexposed setting by N.

4. The method of multiple-exposure multiple-frame image capture of claim 1, further comprising:

iteratively indexing a capturing of another first group of frames at the underexposed setting by N; and iteratively indexing a capturing of another second group of frames at the underexposed setting by N.

5. The method of multiple-exposure multiple-frame image capture of claim 1, wherein the first group of frames and the second group of frames are raw data.

6. The method of multiple-exposure multiple-frame image capture of claim 1, wherein the first group of frames and the second group of frames are low dynamic range.

7. The method of multiple-exposure multiple-frame image capture of claim 1, wherein the first key frame is based on a best frame within the first group of frames.

8. The method of multiple-exposure multiple-frame image capture of claim 1, wherein the second key frame is based on a best frame within the second group of frames.

9. The method of multiple-exposure multiple-frame image capture of claim 1, wherein the first group of frames and the second group of frames are captured with approximately equivalent exposure.

10. The method of multiple-exposure multiple-frame image capture of claim 1, wherein the first group of frames are buffered.

11. The method of multiple-exposure multiple-frame image capture of claim 1, wherein the second group of frames are buffered.

* * * * *